United States Patent
Suzuki

(10) Patent No.: US 6,456,655 B1
(45) Date of Patent: *Sep. 24, 2002

(54) IMAGE ENCODING USING ACTIVITY DISCRIMINATION AND COLOR DETECTION TO CONTROL QUANTIZING CHARACTERISTICS

(75) Inventor: Toshihiko Suzuki, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/534,249

(22) Filed: Sep. 26, 1995

(30) Foreign Application Priority Data

Sep. 30, 1994 (JP) ............................................. 6-237904
Sep. 30, 1994 (JP) ............................................. 6-237905

(51) Int. Cl.$^7$ ................................................ H04N 7/18
(52) U.S. Cl. .............................. 375/240.03; 375/240.07
(58) Field of Search ................................ 348/405, 420, 348/406, 404, 421; 375/240.03–240.08

(56) References Cited

U.S. PATENT DOCUMENTS

| | | | | |
|---|---|---|---|---|
| 5,294,974 A | * | 3/1994 | Naimpally et al. | 348/450 |
| 5,323,187 A | * | 6/1994 | Park | 348/405 |
| 5,333,012 A | * | 7/1994 | Singhal et al. | 348/405 |
| 5,369,439 A | * | 11/1994 | Matsuda et al. | 348/405 |
| 5,396,567 A | * | 3/1995 | Jass | 348/405 |
| 5,410,351 A | * | 4/1995 | Kojima | 348/405 |
| 5,434,623 A | * | 7/1995 | Coleman et al. | 348/405 |
| 5,440,344 A | * | 8/1995 | Asamura et al. | 348/405 |
| 5,475,433 A | * | 12/1995 | Jeong | 348/405 |
| 5,481,309 A | * | 1/1996 | Juri et al. | 348/405 |
| 5,552,829 A | * | 9/1996 | Kim et al. | 348/405 |
| 5,721,544 A | | 2/1998 | Suzuki | 341/50 |
| 5,861,921 A | | 1/1999 | Shimizu et al. | 348/405 |
| 6,075,619 A | | 6/2000 | Iizuka | 358/432 |

* cited by examiner

Primary Examiner—Andy Rao
(74) Attorney, Agent, or Firm—Fitzpatrick, Cella, Harper & Scinto

(57) ABSTRACT

An image encoding apparatus is constructed by an orthogonal converting unit for orthogonal converting image data that is inputted every block consisting of a plurality of pixels, thereby obtaining conversion coefficients, a quantizing unit for quantizing the conversion coefficients, a detecting unit for detecting specific color information from the image data, a control unit for controlling quantizing characteristics of the quantizing unit on the basis of a detection result of the detecting unit, and an encoding unit for encoding quantization data that is obtained from the quantizing unit. Another image encoding apparatus is constructed by an orthogonal converting unit for orthogonal converting image data which is inputted every block consisting of a plurality of pixels, thereby obtaining conversion coefficients, a quantizing unit for quantizing the conversion coefficients, a detecting unit for detecting a luminance level of the image data, a control unit for controlling quantizing characteristics of the quantizing unit on the basis of a detection result of the detecting unit, and an encoding unit for encoding quantization data obtained from the quantizing unit.

19 Claims, 13 Drawing Sheets

IMAGE ENCODING USING ACTIVITY DISCRIMINATION AND COLOR DETECTION TO CONTROL QUANTIZING CHARACTERISTICS

BACKGROUND OF THE INVENTION

1. Field of the Invention

The invention relates to an image encoding apparatus and, more particularly, an image encoding apparatus using an orthogonal conversion encoding.

2. Related Background Art

As an apparatus using an image encoding apparatus, for example, a digital VTR for digitizing an image signal and recording and reproducing the digital signal has been known hitherto. In such a digital VTR, a compression encoding technique for compressing image data and recording and reproducing the compressed image data is used. As a technique for high efficiently compressing and encoding image data, an orthogonal conversion encoding system is known. According to such a system, after the image data was divided into blocks every plural pixels, an orthogonal conversion such as a discrete cosine transformation (hereinafter, simply referred to as a DCT) or the like is executed and a quantization, an entropy encoding, and the like are performed to coefficients after completion of the conversion.

FIG. 1 shows a schematic construction of a conventional image encoding apparatus which is used for the DCT. In FIG. 1, reference numeral 100 denotes digital image data which is inputted; 101 a memory to record the image data 100; 103 a DCT circuit for reading out image data 102 stored in the memory 101 on a block unit basis of a predetermined size and discrete cosine transforming and outputting DCT conversion coefficients (DCT coefficients) 105; 106 a buffer for delaying the DCT coefficients 105; 108 a quantization circuit for quantizing the delayed DCT coefficients; 107 an activity discrimination circuit for discriminating an activity of the image data in a frequency area from an AC coefficient 104 in the DCT coefficients 105; 109 a quantization control circuit for controlling the quantization circuit 108 on the basis of the activity of the image judged by the activity discrimination circuit 107; 110 an encoding circuit for variable length encoding quantization data by using, for example, both of a run length encoding and a two-dimensional Huffman encoding; 111 an encoding control circuit for controlling the encoding circuit 110; and 112 encoding data which was variable length encoded.

The operation will now be described. In the memory 101, the input image data 100 is divided into blocks of (8 pixels×8 pixels) on a frame unit basis and, at the same time, a shuffling or the like of the blocks is executed, and the resultant image data is read out. The image data 102 read out from the memory 101 is supplied to the DCT circuit 103. The DCT circuit 103 performs a DCT to the image data 102 every block of (8×8) pixels, converts the image data 102 from a space area to the data of a frequency area, and generates the DCT coefficients 105 as conversion coefficients. FIG. 2 shows a construction of the data of the DCT coefficients 105 of the block of (8×8) pixels. As shown in the diagram, one block is constructed by: a DC coefficient indicative of a mean luminance level of 64 (=8×8) pixels; and an AC coefficient indicative of frequency distributions in the horizontal and vertical directions of an image.

Generally, correlations regarding the time and space of a motion image such as a TV signal or the like are strong. When such a motion image is DCT converted to the data of a frequency area, components are concentratedly distributed in a relatively low frequency area. On the other hand, the discriminating characteristics of the human eyes are sharp for a low frequency, namely, a flat image and are dull for a high frequency, namely, a high active image. Therefore, by finely quantizing a low frequency area and coarsely quantizing a high frequency area, a quantization distortion is concentrated to a high frequency portion of the image. A deterioration of a picture quality on a visual sense can be suppressed.

From the above principle, the activity discrimination circuit 107 of the image obtains an activity of the image data from the AC coefficient 104 and provides activity information corresponding to the activity to the quantization control circuit 109.

The quantization circuit 108 divides the DCT coefficients 105 into four areas from the low frequency area to the high frequency area as shown in, for example, FIG. 3 by a control of the quantization control circuit 109 and executes a quantization while making quantization steps coarse in accordance with the order of [area 0<area 1<area 2<area 3]. The buffer 106 delays the data by a time corresponding to the delay which is caused until the quantization level is controlled on the basis of the data of the DCT coefficients 105 which were DCT converted.

The encoding circuit 110 zigzag scans the quantization data which is two-dimensionally arranged and which is obtained from the quantization circuit 108 in the direction from a low space frequency to a high space frequency, thereby changing to the one-dimensional data. After that, the encoding circuit variable length encodes the zero coefficients by a run length encoding and also variable length encodes the non-zero coefficients by a two-dimensional Huffman encoding and generates the encoding data 112. In the run length encoding, the data is reversely compressed by counting the zero run. In the Huffman encoding, a short code word is allocated to the data having a high occurrence probability and a long code word is allocated to the data having a low occurrence probability, thereby averagely reducing an information amount.

As mentioned above, in the conventional image encoding apparatus, the quantization control is executed on the basis of the activity information of the image data. However, in case of quantizing a chrominance signal, since there is a difference between the human visual sense characteristics of the I axis (orange—cyan axis) system and the Q axis (yellow green—purple axis) system, it is undesirable to equally handle both of them. Particularly, there is a problem such that a deterioration of the picture quality is conspicuous in an image having a hue of the red system that can be easily perceived by the human being.

According to the discriminating characteristics of the human eyes to recognize an image, it is known that even in case of objects having the same hue, a visual recognizing performance changes depending on its brightness.

FIGS. 4A and 4B show such a state. FIG. 4A is a characteristics graph of an image of a high luminance level. FIG. 4B is a characteristics graph of an image of a low luminance level. In each of FIGS. 4A and 4B, the height direction shows an amplitude of the image and a lateral direction indicates a time. Generally, there is a tendency such that as for the luminance information and color information of the image, since a band of the latter information is narrow, outlines of chrominance signals (C1, C2) are widened in the time direction as shown in the diagrams for luminance signals (Y1, Y2). Visually, the visual recognition for the outline of the luminance signal is dominant and the perception of a color blur is hard to be discriminated.

However, the perception of the color blur is largely influenced in accordance with the luminance level and the color blur of the low luminance image of FIG. 4B is visually more conspicuous than the color blur of the high luminance image of FIG. 4A.

There is a problem such that the color blur in the low luminance image visually causes an S/N feeling and a resolution feeling to be deteriorated. This suggests that the optimum band of the chrominance signal exists in accordance with the luminance level of the image.

SUMMARY OF THE INVENTION

Under such circumstances, it is an object of the invention to provide an image encoding apparatus which can reduce a deterioration in picture quality due to a hue.

According to a preferred embodiment of the invention, the above object is accomplished by an image encoding apparatus comprising: orthogonal converting means for orthogonal converting image data that is inputted every block consisting of a plurality of pixels and obtaining conversion coefficients; quantizing means for quantizing the conversion coefficients; detecting means for detecting specific color information from the image data; control means for controlling quantizing characteristics of the quantizing means on the basis of a detection result of the detecting means; and encoding means for encoding quantization data that is obtained from the quantizing means.

Another object of the invention is to provide an image encoding apparatus which can reduce a deterioration in picture quality in case of a low luminance.

According to a preferred embodiment, the above object is accomplished by an image encoding apparatus comprising: orthogonal converting means for orthogonal converting image data which is inputted every block consisting of a plurality of pixels and obtaining conversion coefficients; quantizing means for quantizing the conversion coefficients; detecting means for detecting a luminance level of the image data; control means for controlling quantizing characteristics of the quantizing means on the basis of a detection result of the detecting means; and encoding means for encoding quantization data which is obtained from the quantizing means.

Other objects, features and advantages of the invention will become apparent from the following detailed description taken in conjunction with the accompanying drawings.

DETAILED DESCRIPTION OF THE PREFERRED EMBODIMENTS

Figure 1:
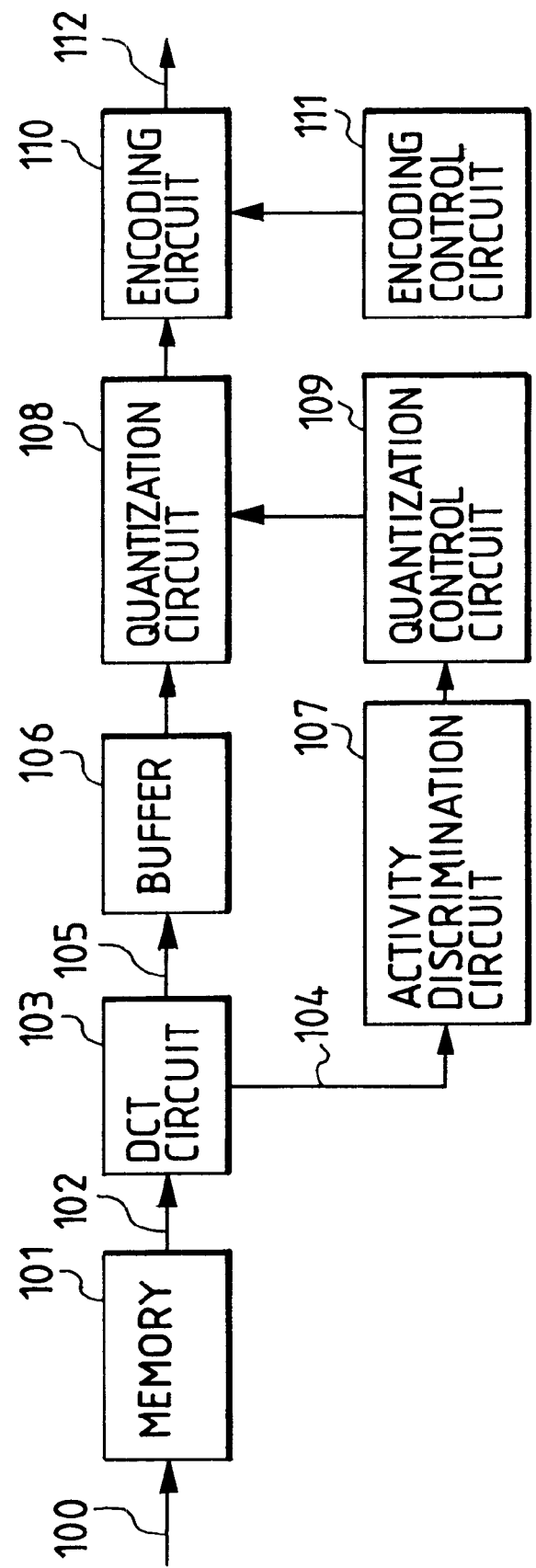
FIG. 1 is a block diagram showing a conventional image encoding apparatus.
Figure 2:
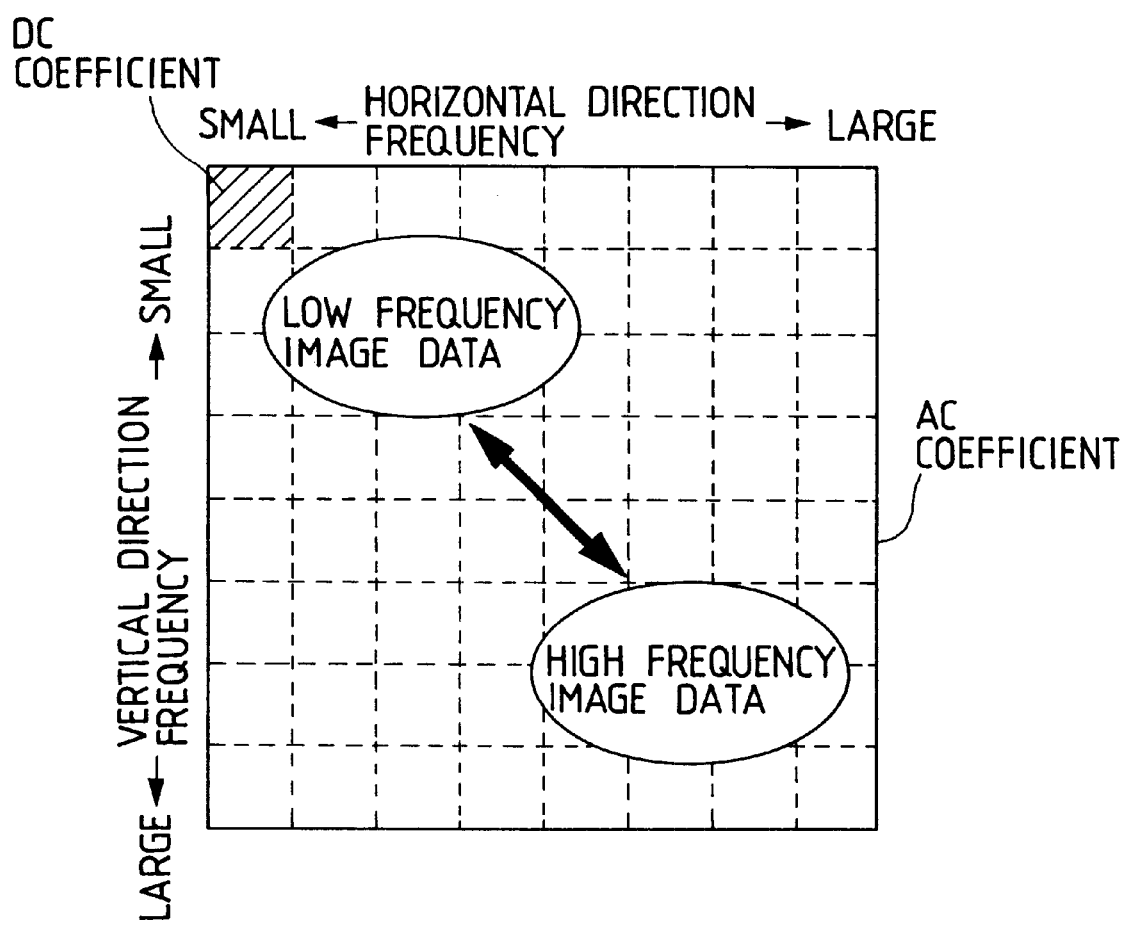
FIG. 2 is a diagram showing a distribution of DCT coefficients.
Figure 3:
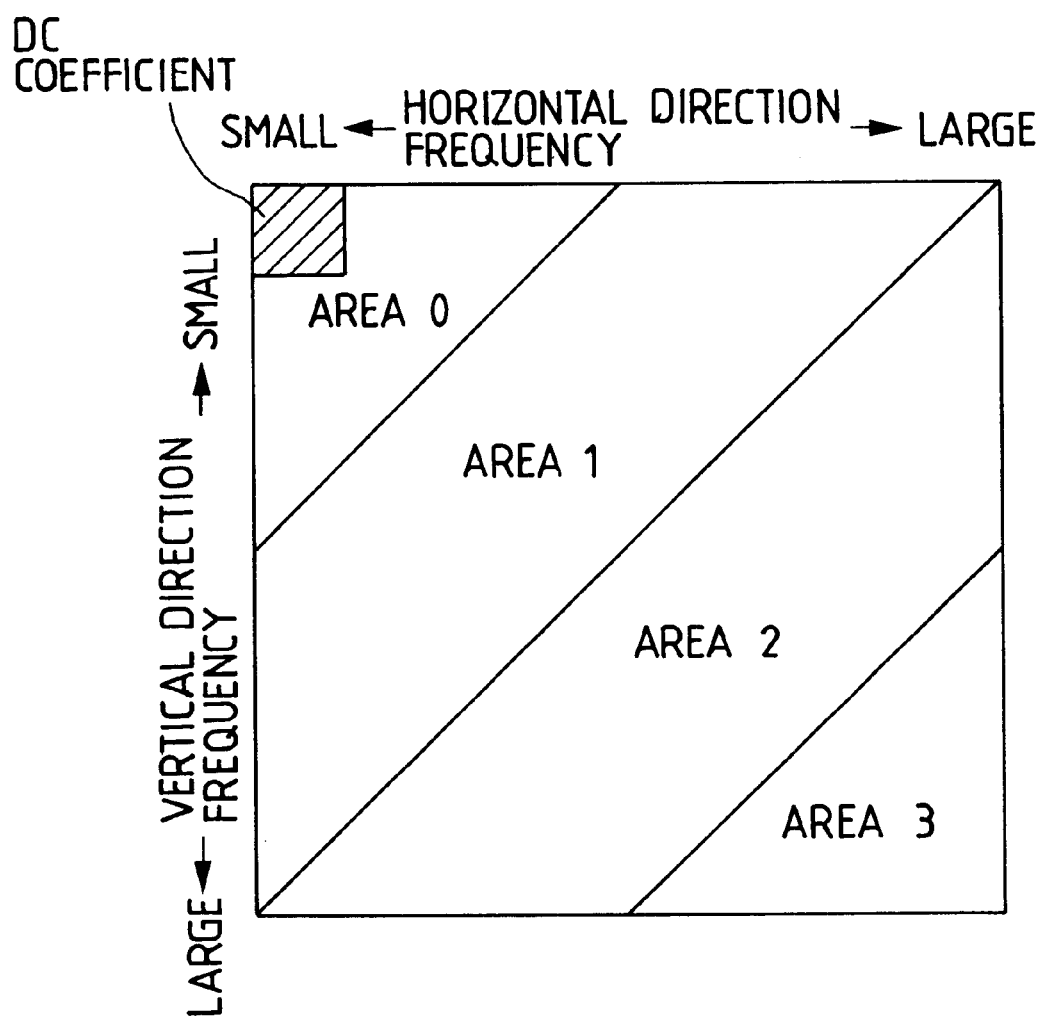
FIG. 3 is an explanatory diagram for dividing into quantization areas.
Figure 4A:
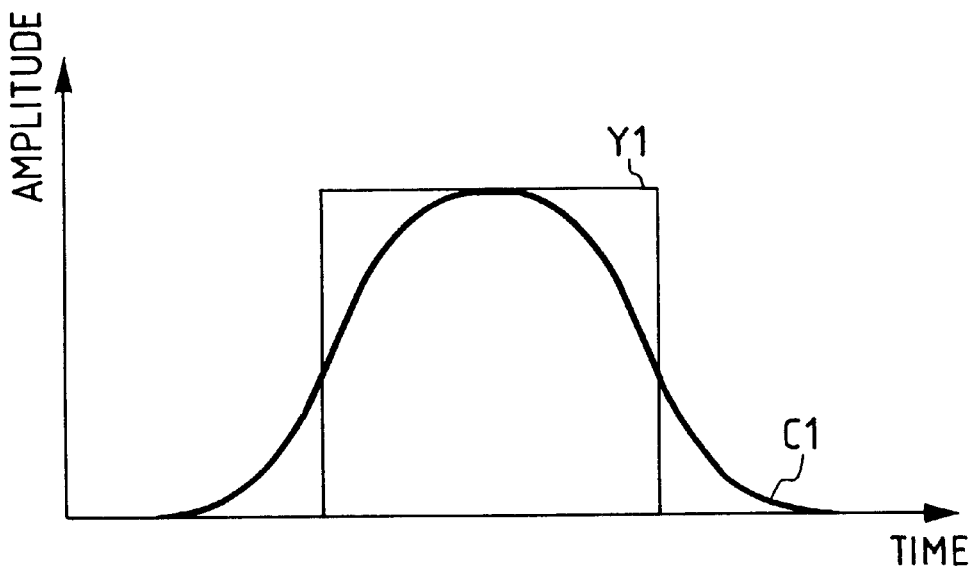
FIGS. 4A and 4B are characteristics graphs showing the relations among a high luminance signal, a low luminance signal, and chrominance signals.
Figure 4B:
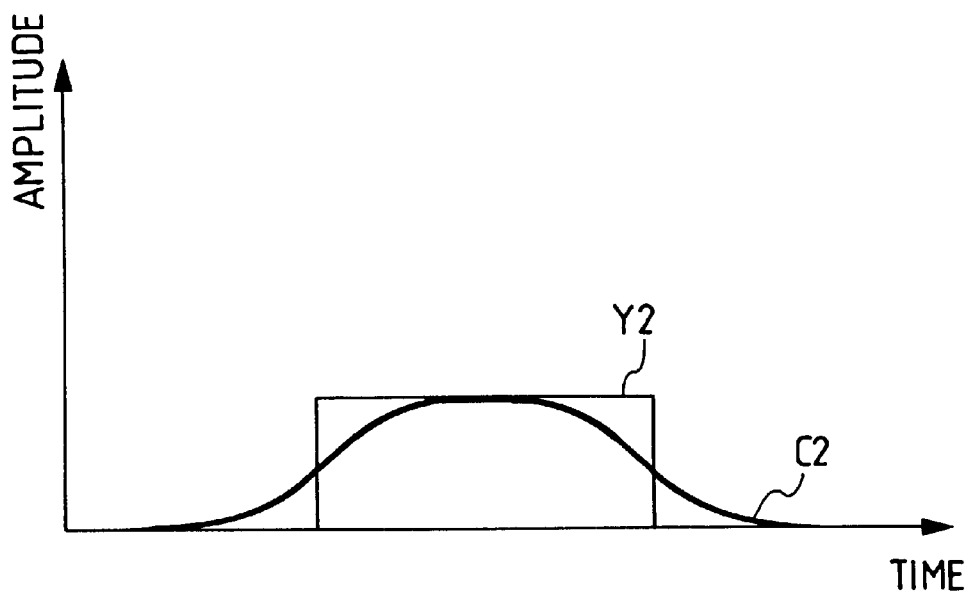
Figure 5:
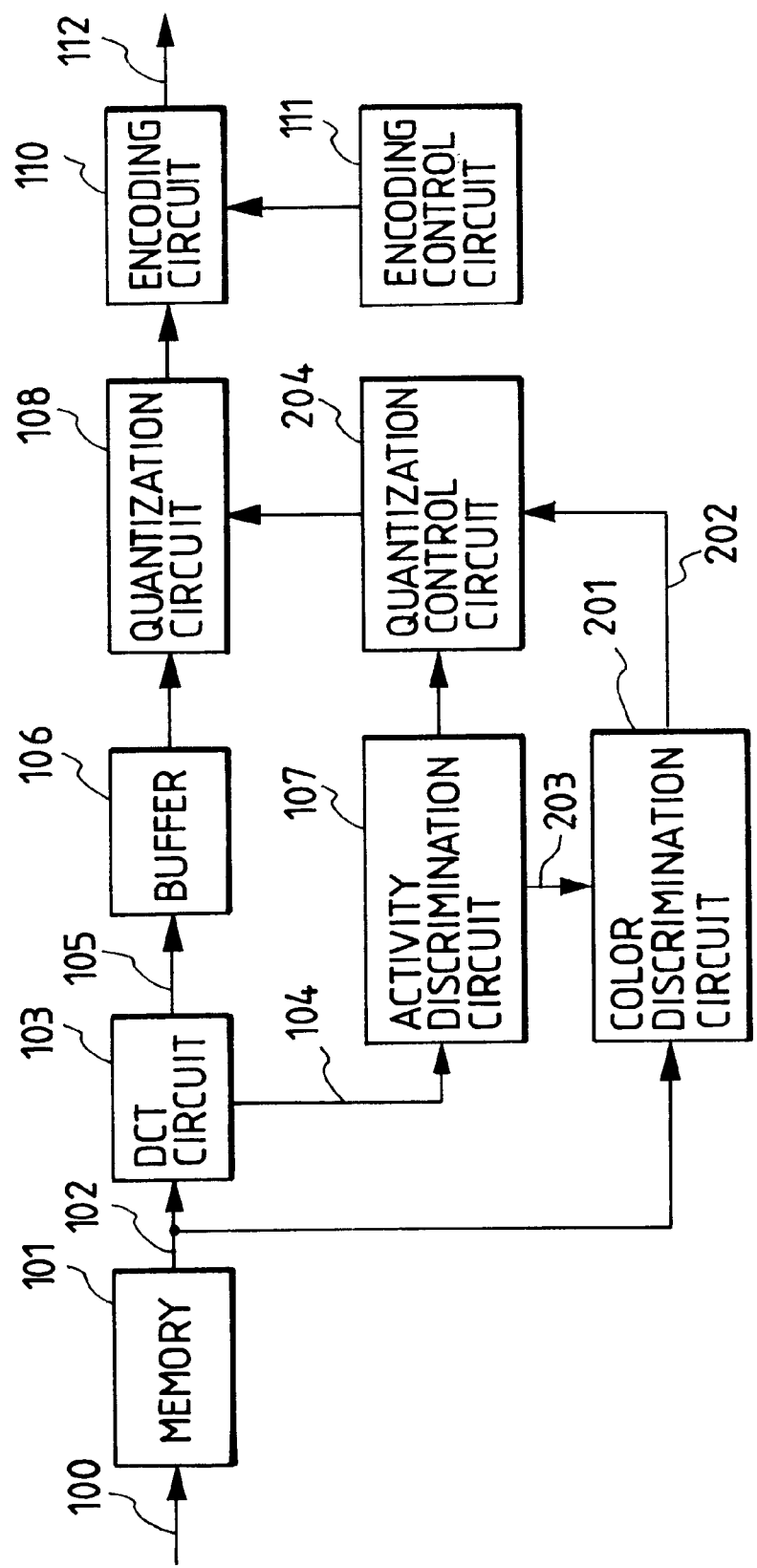
FIG. 5 is a block diagram of an image encoding apparatus of the first embodiment according to the invention.

FIG. 5 is a block diagram showing most preferably the first embodiment of the invention and the portions corresponding to those in FIG. 1 are designated by the same reference numerals and their descriptions are omitted.

In FIG. 5, reference numeral 201 denotes a color discrimination circuit for discriminating a color of the image data 102 from the memory 101 on the basis of the activity information of the activity discrimination circuit 107.

Figure 6:
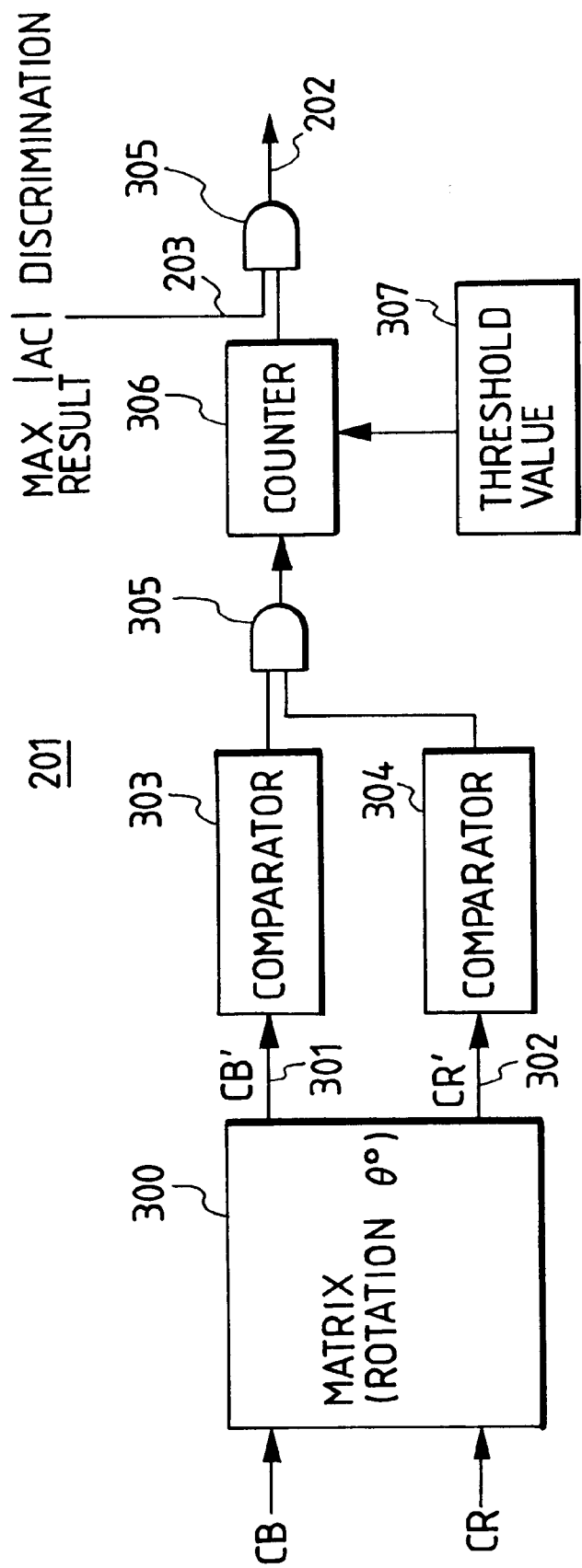
FIG. 6 is a block diagram showing an embodiment of a color discrimination circuit in FIG. 5.

The operation of the embodiment will now be described. Color difference data (B−Y) and (R−Y) in the image data 102 of every block which is supplied from the memory 101 corresponding to the image data 100 are referred to as CB and CR, respectively. FIG. 6 shows an embodiment of the color discrimination circuit 201 constructed by a matrix converting circuit 300, comparators 303 and 304, a counter 306, and the like.

In FIG. 6, the block-formed color difference image data CB and CR are subjected to coordinates conversion of θ° by the matrix converting circuit 300. Now, assuming that coordinates axes after the conversion are set to CB' and CR', they can be expressed as follows.

$$\begin{pmatrix} CB' \\ CR' \end{pmatrix} = \begin{pmatrix} \cos\theta & \sin\theta \\ -\sin\theta & \cos\theta \end{pmatrix} \begin{pmatrix} CB \\ CR \end{pmatrix} \quad (1)$$

For example, in case of the coordinates conversion of Q=45°, $CB'=(\sqrt{2}/2)\cdot(CB+CR)$ $CR'=(\sqrt{2}/2)\cdot(-CB+CR)$ \quad (2)

The conversion can be realized by simple addition and subtraction.

Figure 7:
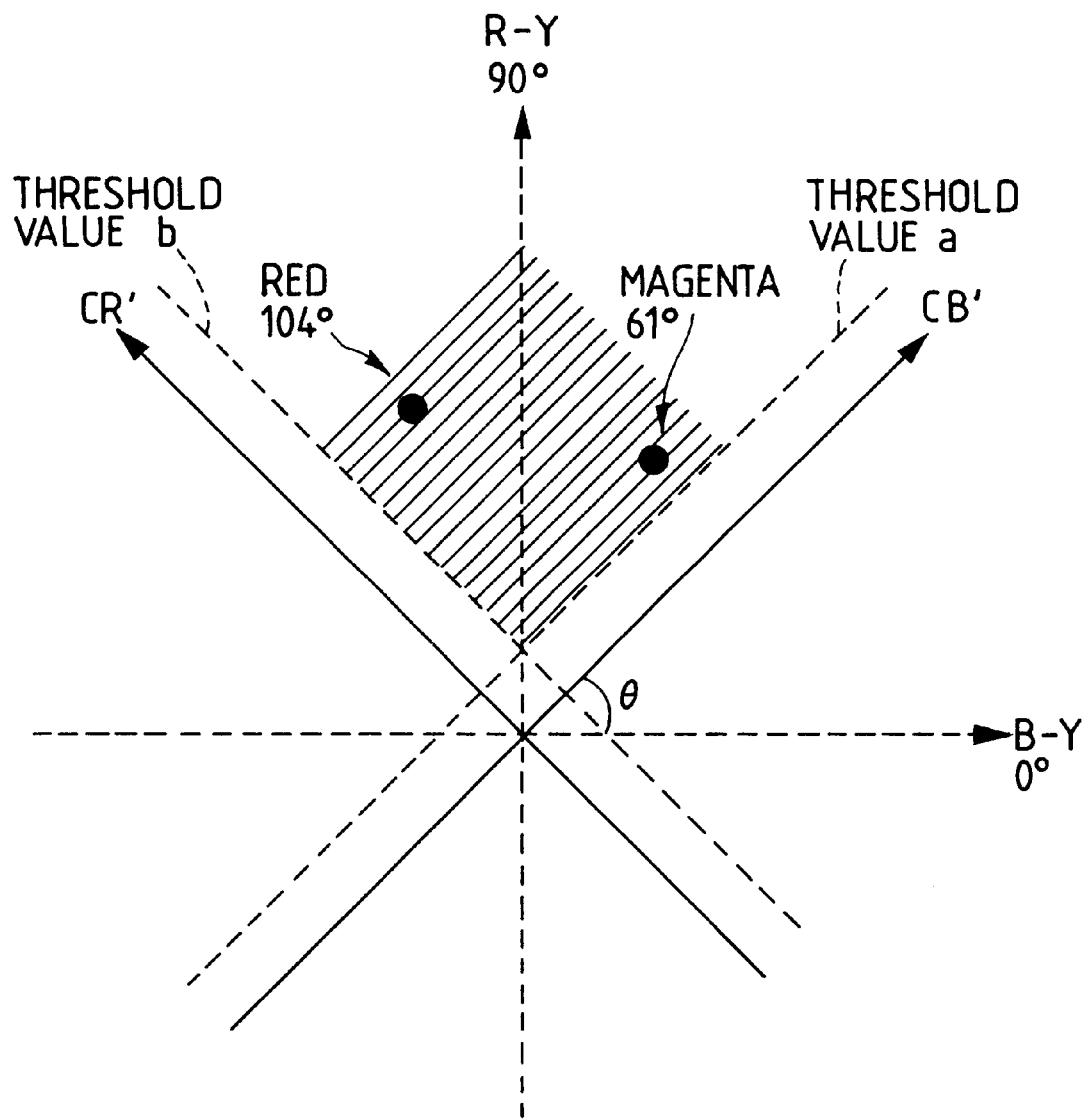
FIG. 7 is an explanatory diagram of a hue discrimination area.

Color difference data 301 and 302 of CR' and CB' after completion of the coordinates conversion are supplied to the comparators 303 and 304 and are compared with preset threshold values. FIG. 7 shows a state of such an area comparison. In the example of FIG. 7, in order to judge chrominance signals of red (104°) and magenta (61°) from the color difference data 301 and 302, threshold values (a) and (b) are provided for the coordinates axes CR' and CB' which were converted by Q=45°, thereby performing an area comparison. When the threshold value (a) for the CR' axis and the threshold value (b) for the CB' axis are set to (CR'>a) and (CB'>b), respectively, the color difference data corresponding to the hatched regions including red and magenta in FIG. 7 can be extracted.

It is now assumed that the area designation of the hue can be realized by the coordinates conversion by an arbitrary angle and the comparison by at least one or more threshold values.

Figure 8:
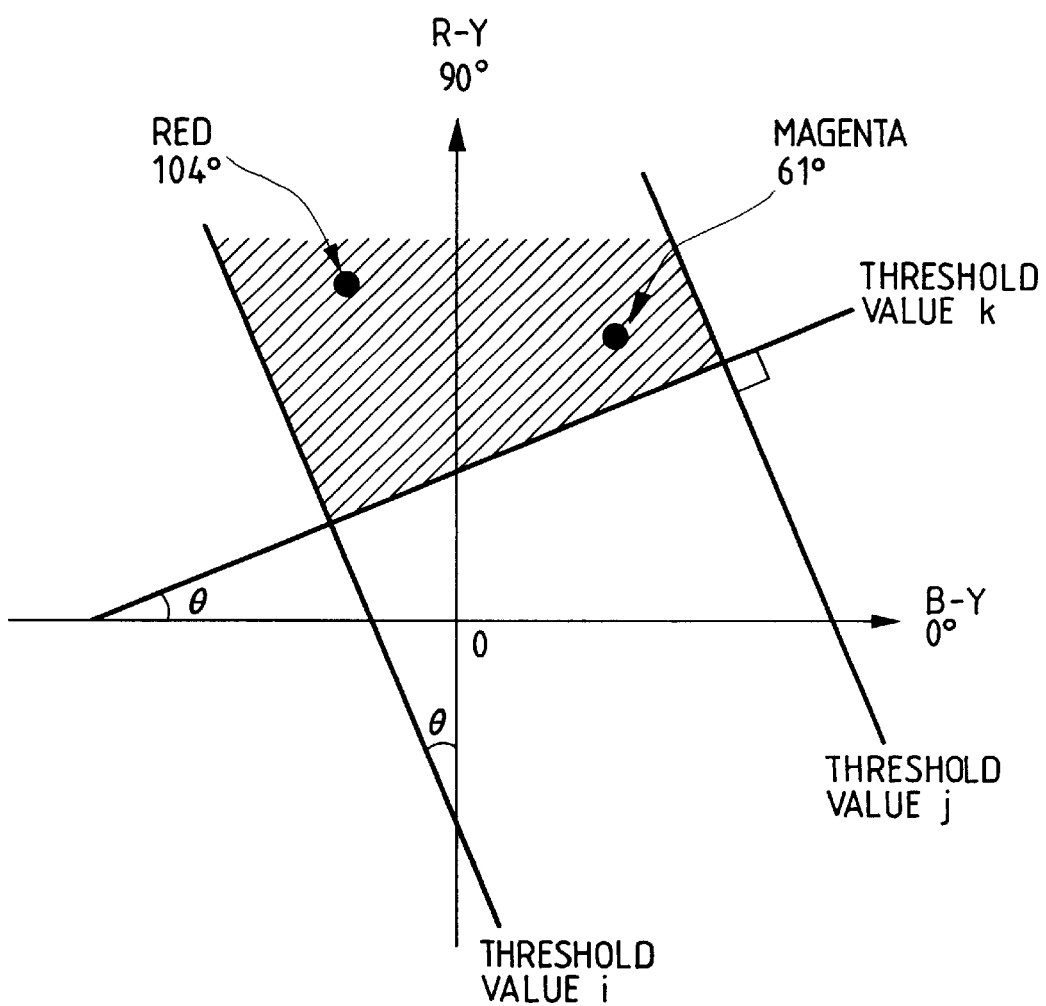
FIG. 8 is another explanatory diagram of a hue discrimination area.

FIG. 8 shows a case where one or more threshold values which satisfy the relations (i<CR'<j) and (k<CB') are set for the CR' axis and CB' axis whose coordinates were rotated by θ in order to detect red and magenta.

Figure 9:
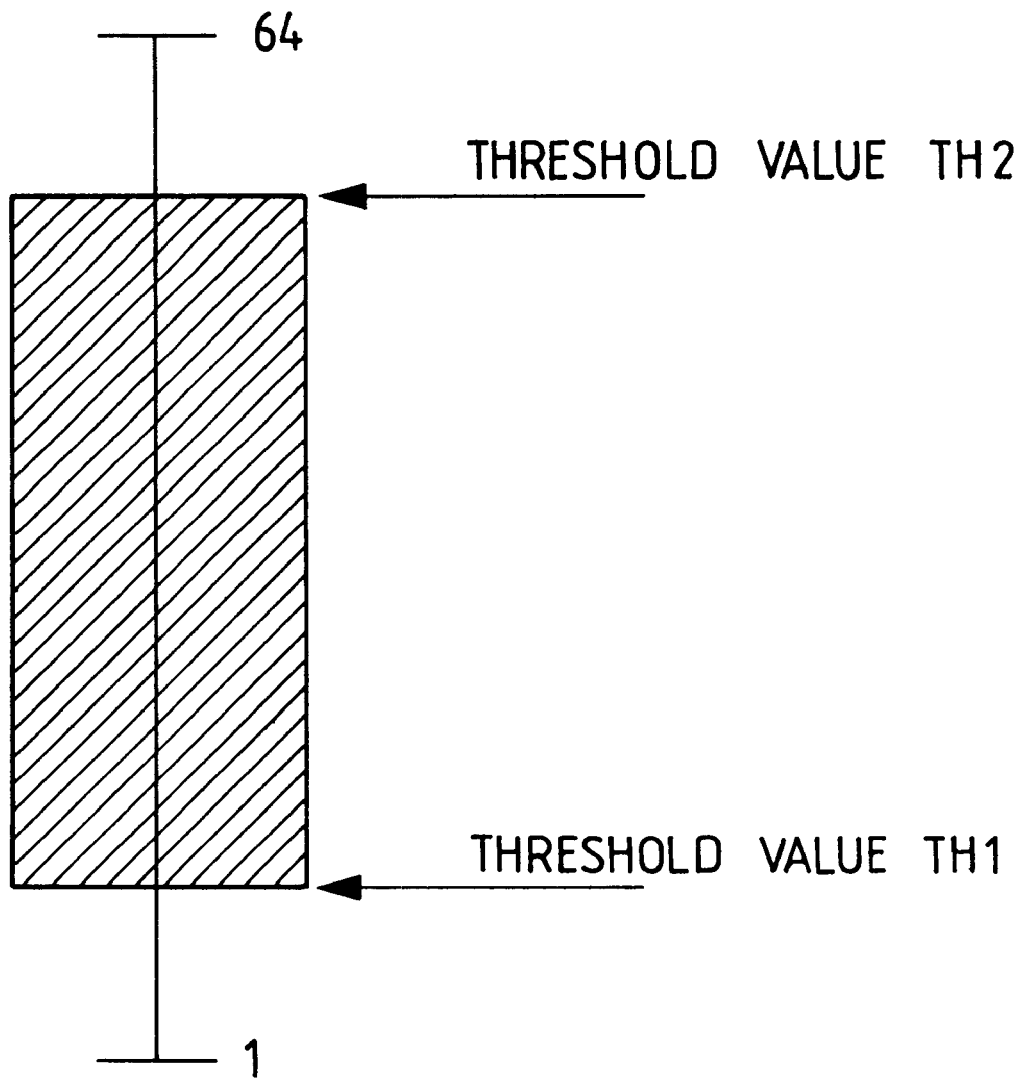
FIG. 9 is an explanatory diagram for accumulating pixels in a block.

After the pixel data having the colors corresponding in the area was extracted as mentioned above, it is accumulated by the counter 306. For example, as shown in FIG. 9, TH1 and TH2 are provided as at least one or more threshold values 307 (FIG. 6) and the number of corresponding pixels existing in the hatched region between TH1 and TH2 is counted with respect to the pixels (8×8=64 pixels) in the block. In FIG. 9, when the pixels of the number corresponding to the hatched region (1≦TH1<the number of pixels in the block<TH2≦64) are detected, the color discrimination result of such a block is made active.

Subsequently, the color discrimination is performed on the basis of both of the color judgment result and activity information 203 of the image which is obtained from the activity discrimination circuit 107 in FIG. 5. That is, even when the color of the image block has a specific color, so long as a low frequency image (flat image) is judged from the frequency distribution, max|AC|203 in FIG. 6 is at the low level. In this instance, the low level is outputted as color discrimination information 202. When activity information 203 judges a high frequency image, max|AC|203 is set to the high level. The high level is outputted as color discrimination information 202.

A quantization control circuit 204, therefore, controls in a manner such that upon quantization of the color difference image data, when the color discrimination information 202 is at the high level, finer quantization steps are allocated to the peripheral DCT blocks. On the contrary, when the color discrimination information 202 is at the low level, the quantization step control is made independent on the color discrimination information 202.

According to the embodiment as mentioned above, in order to discriminate the color of the image block data, the color difference data (B-Y) and (R-Y) are coordinates converted, an area of a specific hue is judged by a comparator, and color information is detected. On the basis of the detection result and the activity information, even in case of specific color data, if the max|AC| of the AC coefficient after completion of the DCT is low and the image is a flat image, the quantization steps are controlled so as not to allocate a code amount larger than that is needed. Thus, an encoding efficiency can be improved. The color discrimination circuit 201 can judge an arbitrary hue without remarkably increasing a hardware amount.

According to the embodiment as described above, since the quantization is controlled in accordance with the color information of the image data, there is an effect such that the more optimum quantization control can be realized for image data having a hue of the I axis system including, for example, red and magenta that is sensitive to the human visual recognizing characteristics. Specifically speaking, there is an effect such that by detecting the block of a specific color and allocating a fine quantization step to such a block, a distortion such as a mosquito noise block distortion or the like can be reduced.

Figure 10:
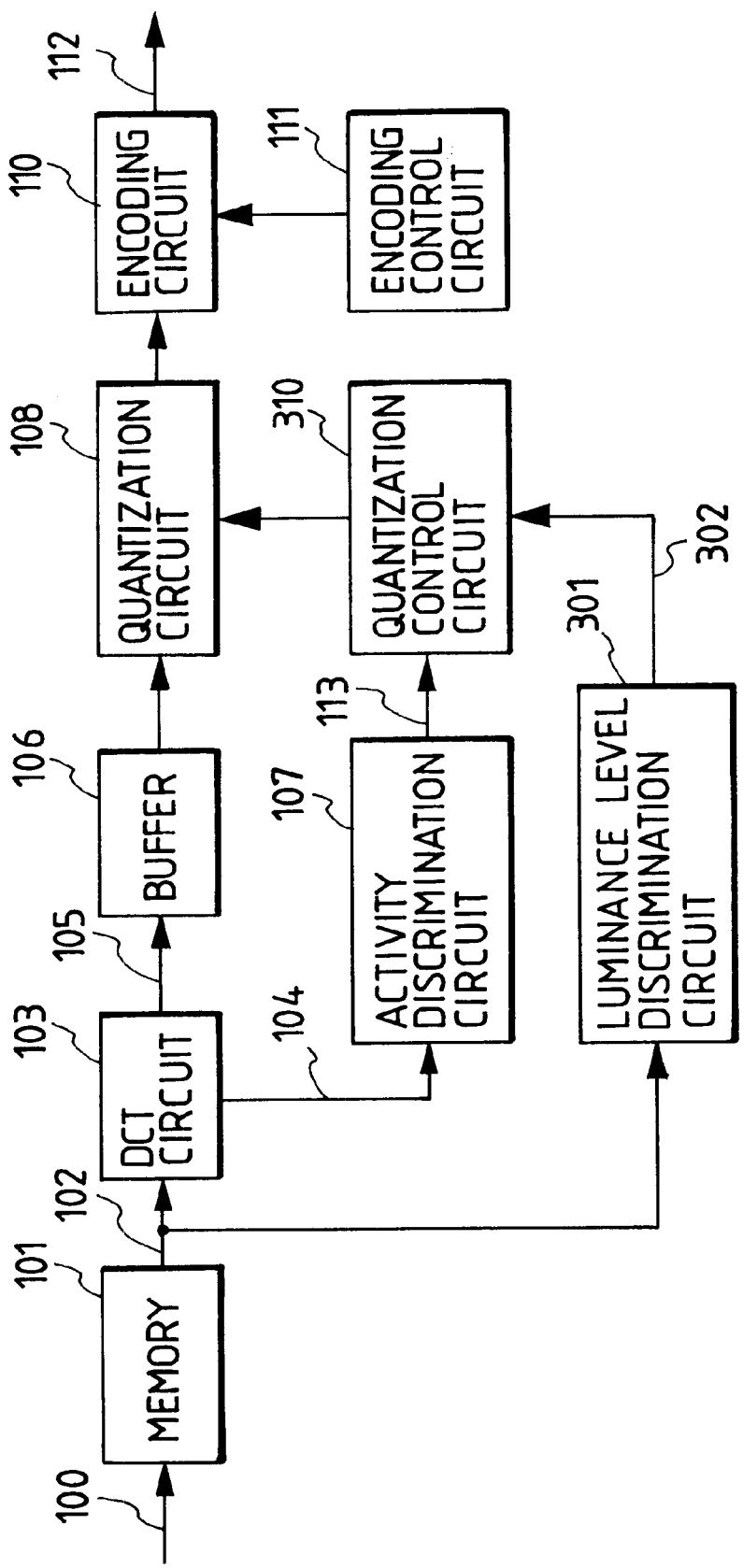
FIG. 10 is a block diagram of an image encoding apparatus of the second embodiment according to the invention.
Figure 11:
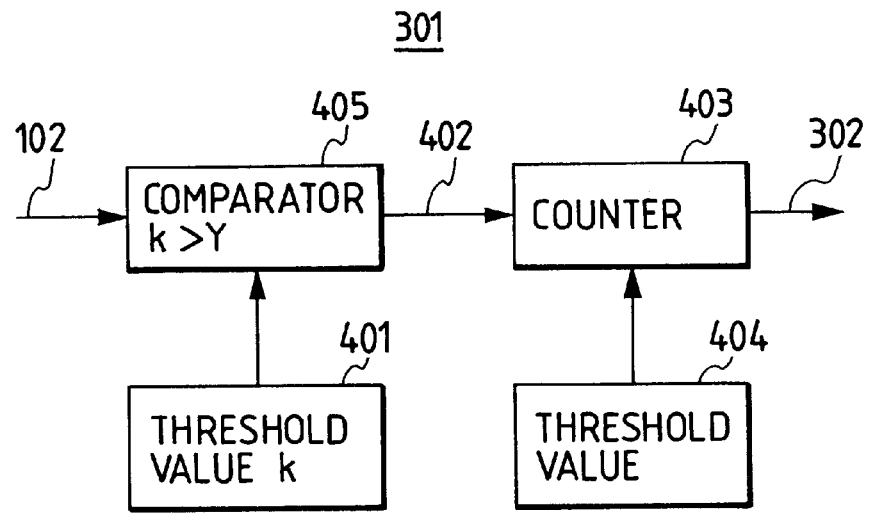
FIG. 11 is a block diagram showing an embodiment of a luminance level discrimination circuit in FIG. 10.

FIG. 10 is a block diagram showing most preferably a feature of the second embodiment of the invention and the portions corresponding to those in FIG. 1 are designated by the same reference numerals and their descriptions are omitted here. In the diagram, reference numeral 301 denotes the luminance level discrimination circuit to which the block image data 102 which is read out from the memory 101 is supplied. FIG. 11 is a diagram showing an embodiment of the luminance level discrimination circuit 301. Reference numeral 405 denotes a comparator; 401 and 404 threshold values; and 403 a counter.

The operation will now be described. In FIG. 11, in the inputted block image data 102, the luminance signal and the preset threshold value 401 (k) are compared by the comparator 405. For example, when the quantization level of the digital data of luminance is equal to 220 level, now assuming that the threshold value (k) is equal to, for example, 50 among the 220 levels in a range from 0 to 219, a luminance data component smaller than the quantization level 50 can be detected. By setting the threshold value (k) to a value lower than a dynamic range of the amplitude of the image data 102, the low luminance image data is detected and the luminance data 402 can be outputted.

The low luminance image data 402 is accumulated by the counter 403. When it is assumed that the block image data 102 is set to the block of (8×8) pixels, since there are 64 (=8×8) pixels, by setting the threshold value 404 of the counter 403 to, for example, a value that is larger than the majority of 64 pixels, it is possible to judge that the mean luminance level in the block is a low luminance. The low luminance information 302 can be outputted.

Figure 12:
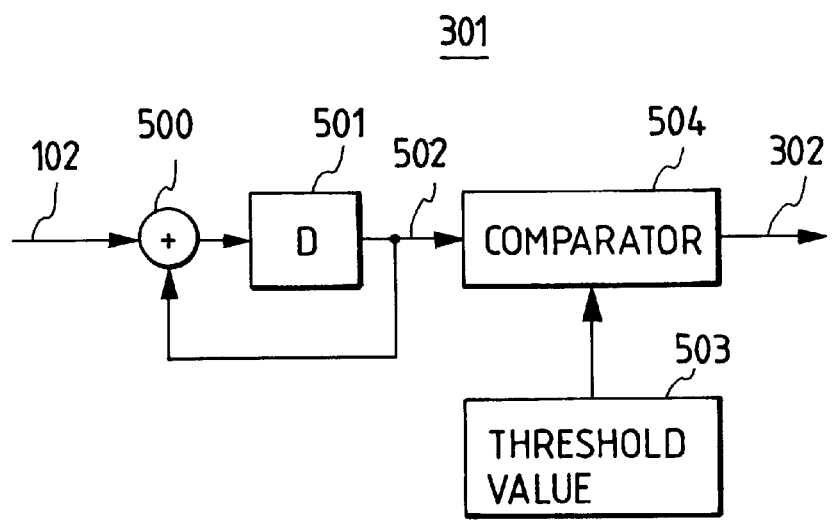
FIG. 12 is a block diagram showing another embodiment of the luminance level discrimination circuit.

FIG. 12 is a diagram showing another embodiment of the luminance level discrimination circuit 301. In FIG. 12, reference numeral 500 denotes an adder; 501 a delay circuit; 504 a comparator; and 503 a threshold value. In FIG. 12, as for the block image data 102 inputted, amplitude levels of all of the block images are accumulated by an accumulator constructed by the adder 500 and the delay circuit 501 having a delay amount of one pixel. In case of the block constructed by 64 (=8×8) pixels, accumulation sum data 502 indicative of the sum of the amplitudes of 64 pixels is obtained. Subsequently, the accumulation sum data 502 is compared with the predetermined threshold value 503 by the comparator 504, so that the low luminance information 302 is outputted as a judgment result. By setting the threshold value 503 to a low value in a dynamic range as compared with the accumulation sum data 502 of the block image data 102, when the input image block has a low luminance, the low luminance information 302 can be outputted.

As mentioned above, the low luminance information 302 of the block image data is supplied to the quantization control circuit 310 in FIG. 10 by the luminance level discrimination circuit 301.

The quantization control circuit 310 handles not only the low luminance information 302 but also activity information 113 obtained from the activity discrimination circuit 107 as control parameters. An embodiment of the activity discrimination circuit. 107 is shown in FIG. 13.

Figure 13:
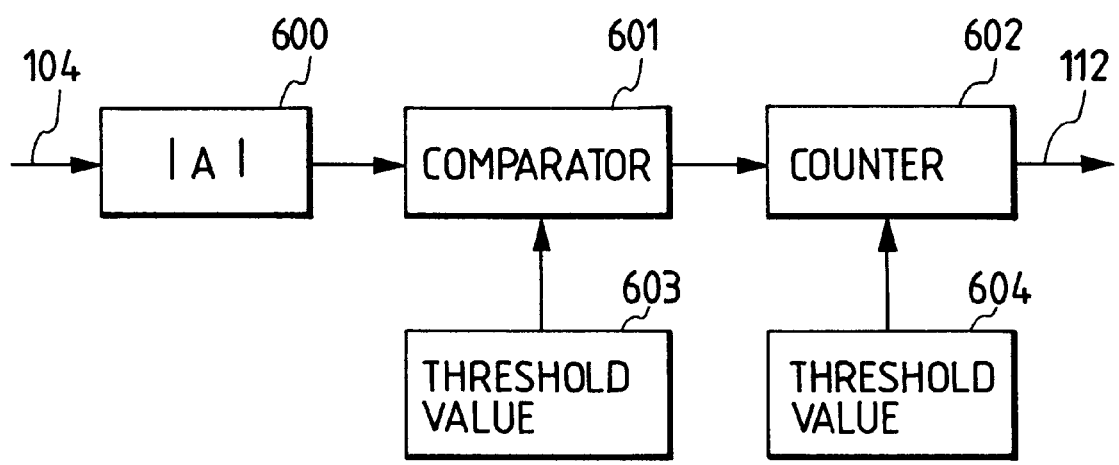
FIG. 13 is a block diagram showing an embodiment of an activity discrimination circuit in FIG. 10.

In FIG. 13, reference numeral 600 denotes an absolute value circuit; 601 a comparator; 602 a counter; and 603 and 604 threshold values. In this construction, the AC coefficient 104 which is inputted from among the DCT coefficients is supplied to the absolute value circuit 600, by which the absolute value is derived. A magnitude component of the coefficient is sent to the comparator 601 at the next stage. The comparator 601 compares at least one or more threshold value 603 and the input coefficient. How long the significance coefficients are extended in the frequency area is discriminated by the counter 602. The counter 602 compares the counter value with at least one or more threshold values 604 and outputs the activity information indicating that the activity is high if the significance coefficients are extended to a high frequency range and that, on the contrary, the activity is low when a distribution of the significance coefficients lies within only a low frequency range.

On the basis of the activity information 113 and low luminance information 302 obtained as mentioned above, when the activity is high and the luminance is low, the quantization control circuit 310 executes a quantization control in a manner such that the quantization width of the quantization circuit 108 is narrowed and, when the activity is low (namely, flat), the control doesn't depend on the low luminance information.

According to the embodiments as mentioned above, the luminance level is detected from the image data in consideration of the characteristics of the image visibility for the color, and on the basis of the detection result, the finer quantization control is performed by finely setting the quantization steps of the chrominance signals in case of the low luminance, and in case of the high luminance, the quantization control that is more coarse than that in case of the low luminance without changing the quantization steps of the chrominance signals. By executing such a quantization control, the quantization steps of the chrominance signals are controlled in accordance with the luminance level of the image, so that the invention can contribute to the improvement of the picture quality of the chrominance signals and the improvement of the encoding efficiency.

Figure 14:
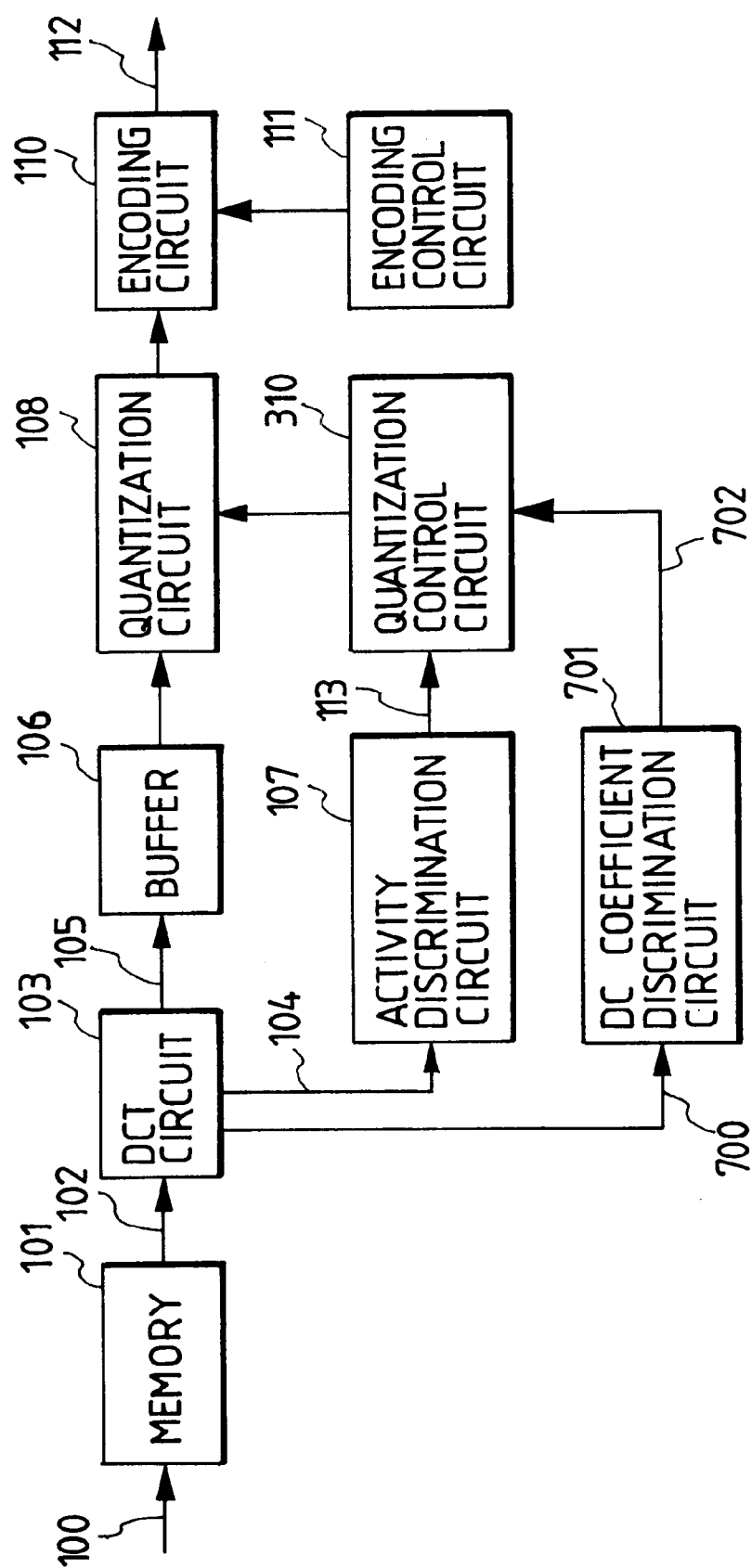
FIG. 14 is a block diagram of an image encoding apparatus of the third embodiment according to the invention.

FIG. 14 is a block diagram showing a feature of the third embodiment of the invention and the portions corresponding to those in FIGS. 1 and 10 are designated by the same reference numerals and their descriptions are omitted here.

In FIG. 14, reference numeral 701 denotes a DC coefficient discrimination circuit.

The operation will now be described. In FIG. 14, the inputted image data 100 is divided into blocks by the memory 101 and becomes the image data 102. The AC coefficient 104 and a DC coefficient 700 are supplied from the DCT circuit 103 to the activity discrimination circuit 107 and the DC coefficient discrimination circuit 701. An activity of the image is discriminated by the activity discrimination circuit 107 from the frequency distribution of the AC coefficient 104 and the activity information 113 is derived. The DC coefficient 700 is a parameter indicative of the mean luminance of the block image data 102. By comparing the DC coefficient 700 with a preset threshold value by the DC coefficient discrimination circuit 701, a check is made to see if the mean luminance of the block image data 102 is low or not. When setting the threshold value, at least one or more value is set for a dynamic range of the DC coefficient 700 and low luminance information 702 indicating that the data has a low luminance is outputted. The subsequent quantization control is executed in a manner similar to that in case of the second embodiment of FIG. 10.

Many modifications and variations of the present invention are possible without departing from the spirit and main features of the invention.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A color image encoding apparatus comprising:
   a) an orthogonal converter for orthogonally converting every block of color image data that is inputted representing an input color image, each block consisting of a plurality of pixels, thereby obtaining conversion coefficients;
   b) a detector for detecting an activity of the input color image according to said conversion coefficients;
   c) a discriminator for discriminating whether or not the input color image is data representing a predetermined hue;
   d) a quantizer for quantizing the conversion coefficients in accordance with quantizing characteristics; and
   e) a controller for controlling the quantizing characteristics according to a detection result of said detector and a discrimination result of said discriminator, said controller controlling the quantizing characteristic regardless of the discrimination result provided by said discriminator, when said detector detects that the activity of the input color image is low or high.

2. An apparatus according to claim 1, wherein when said discriminator discriminates that the input color image data is the data representing the predetermined hue and said detector detects that the activity of the input color image is high, said controller makes quantization steps in said quantizer fine.

3. An apparatus according to claim 1, wherein said detector detects the activity of the input color image from a distribution state of an AC coefficient included in the conversion coefficients.

4. An apparatus according to claim 1, where said detector includes:
   an arithmetic operator for performing a matrix arithmetic operation of color difference data obtained from said image date;
   a comparer for comparing at least one threshold value and an arithmetic operation result of said arithmetic operator; and
   a counter for accumulating a comparison result of said comparer and comparing an accumulation result with at least one or more threshold values.

5. An apparatus according to claim 4, wherein said controller further includes an AND device for getting the AND of an output of said counter and an output of said detector, thereby controlling a quantizing characteristic of said quantizer.

6. An apparatus according to claim 4, wherein said discriminator variably sets a selected hue as the predetermined hue for detection.

7. A color image encoding method comprising the steps of:
   a) orthogonally converting every block of color image data that is inputted representing an input color image, each block consisting of a plurality of pixels, thereby obtaining conversion coefficients;
   b) detecting an activity of the input color image according to said conversion coefficients;
   c) discriminating whether or not the input color image is data representing a predetermined hue;
   d) quantizing the conversion coefficients in accordance with quantizing characteristics; and
   e) controlling the quantizing characteristics according to a detection result of said detecting step and a discrimination result of said discriminating step, said controlling step controlling the quantizing characteristic regardless of the discrimination result obtained in said discriminating step, when it is detected in said detecting step that the activity of the input color image is low or high.

8. A color image encoding apparatus comprising:
   a) an orthogonal converter for orthogonally converting every block of color image data that is inputted representing an input color image, each block consisting of a plurality of pixels, thereby obtaining conversion coefficients;

b) a detector for detecting an activity of the input color image according to said conversion coefficients;

c) a discriminator for discriminating whether or not the input color image is data representing a predetermined hue;

d) an encoder for encoding the conversion coefficients in accordance with an encoding parameter; and e) a controller for controlling the encoding parameter according to a detection result of said detector and a discrimination result of said discriminator, said controller controlling the encoding parameter regardless of the discrimination result provided by said discriminator, when said detector detects that the activity of the input color image is low or high.

9. An apparatus according to claim 8, wherein when said discriminator discriminates that the input color image data is the data representing the predetermined hue and said detector detects that the activity of the input color image is high, said controller makes quantization-steps in said encoder fine.

10. An apparatus according to claim 8, wherein said discriminator variably sets a selected hue as the predetermined hue for detection.

11. A color image encoding method comprising the steps of:

a) orthogonally converting every block of color image data that is inputted representing an input color image, each block consisting of a plurality of pixels, thereby obtaining conversion coefficients;

b) detecting an activity of the input color image according to said conversion coefficients;

c) discriminating whether or not the input color image is data representing a predetermined hue;

d) encoding the conversion coefficients in accordance with an encoding parameter; and e) controlling the encoding parameter according to a detection result of said detecting step and a discrimination result of said discriminating step, said controlling step controlling the encoding parameter regardless of the discrimination result obtained in said discriminating step, when it is detected in said detecting step that the activity of the input color image is low or high.

12. An image encoding apparatus comprising:

a) an orthogonal converter for orthogonally converting every block of image data that is inputted representing an input image, each block consisting of a plurality of pixels, thereby obtaining conversion coefficients;

b) a detector for detecting an activity of the input image according to said conversion coefficients;

c) a discriminator for discriminating a luminance level of the image data;

d) an encoder for encoding the conversion coefficients in accordance with an encoding parameter; and e) a controller for controlling the encoding parameter according to a detection result of said detector and a discrimination result of said discriminator, said controller controlling the encoding parameter regardless of the discrimination result provided by the discrimination result provided by said discriminator, when said detector detects that the activity of the input color image is low or high.

13. An apparatus according to claim 12, wherein said detector detects the activity from a distribution state of AC coefficients included in said conversion coefficients.

14. An apparatus according to claim 12, wherein said discriminator includes a comparer for comparing a first predetermined threshold value to the image data, and a counter for accumulating comparison results of said comparer to provide an accumulation result and for comparing the accumulation result with a second predetermined threshold level to discriminate the luminance level.

15. An apparatus according to claim 12, wherein said discriminator includes an accumulator for accumulating the image data to provide an accumulation result and for comparing the accumulation result with a predetermined threshold level to discriminate the luminance level.

16. An apparatus according to claim 12, wherein said discriminator discriminates the luminance level from a DC coefficient included in said conversion coefficients.

17. An apparatus according to claim 12, wherein said encoder includes a quantizer for quantizing the conversion coefficients, wherein the encoding parameter is used in a quantizing step of said quantizer.

18. An apparatus according to claim 12, wherein when said detector detects that the activity is low, said controller assigns zero significance to the output of said discriminator in controlling the encoding parameter according to the output of said detector.

19. An image encoding method comprising the steps of:

a) orthogonally converting every block of image data that is inputted representing an input image, each block consisting of a plurality of pixels, thereby obtaining conversion coefficients;

b) detecting an activity of the input image according to said conversion coefficients;

c) discriminating a luminance level of the image data;

d) encoding the conversion coefficients in accordance with an encoding parameter; and e) controlling the encoding parameter according to a detection result of said detecting step and a discrimination result of said discriminating step, said controlling step controlling the encoding parameter regardless of the discrimination result obtained in said discriminating step, when it is detected in said detecting step that the activity of the input color image is low or high.

* * * * *

UNITED STATES PATENT AND TRADEMARK OFFICE
CERTIFICATE OF CORRECTION

PATENT NO. : 6,456,655 B1
DATED : September 24, 2002
INVENTOR(S) : Toshihiko Suzuki It is certified that error appears in the above-identified patent and that said Letters Patent is hereby corrected as shown below:

Column 1,
Line 18, "high efficiently" should read -- highly efficient --; and
Line 43, "of" should be deleted.

Column 3,
Line 8, "be deteriorated." should read -- deteriorate. --.

Column 4,
Line 17, "invention" should read -- invention, --; and

Line 39, "$\begin{pmatrix} cos\theta & sin\theta \\ -sin\theta & con\theta \end{pmatrix}$" should read -- $\begin{pmatrix} \cos\theta & \sin\theta \\ -\sin\theta & \cos\theta \end{pmatrix}$ --.

Column 5,
Line 17, "of" (second occurrence) should be deleted;
Line 34, "on" should read -- of --;
Line 45, "that" (second occurrence) should read -- which --;
Line 52, "optimum" should read -- optimal --; and
Line 54, "example, red and magenta" should read -- example, red and magenta, --.

Column 6,
Line 50, "circuit." should read -- circuit --;
Line 60, "cance" should read -- cant --;
Lines 64 and 66, "significance" should read -- significant --.

UNITED STATES PATENT AND TRADEMARK OFFICE
CERTIFICATE OF CORRECTION

PATENT NO. : 6,456,655 B1
DATED : September 24, 2002
INVENTOR(S) : Toshihiko Suzuki It is certified that error appears in the above-identified patent and that said Letters Patent is hereby corrected as shown below:

Column 7,
Line 25, "invention" should read -- inventions, --; and
Line 27, "and" should read -- while --.

Column 8,
Line 25, "where" should read -- wherein --;
Line 29, "date;" should read -- data; --.

Signed and Sealed this

Fifteenth Day of July, 2003

JAMES E. ROGAN
*Director of the United States Patent and Trademark Office*